US008600011B2

(12) United States Patent  
Gouvia et al.

(10) Patent No.: US 8,600,011 B2  
(45) Date of Patent: Dec. 3, 2013

(54) NAVIGATION SYSTEM SUPPORT OF IN-VEHICLE TTY SYSTEM

(75) Inventors: Jacquelyn A. Gouvia, Royal Oak, MI (US); Travis Bradburn, Ortonvile, MI (US)

(73) Assignee: General Motors, LLC., Detroit, MI (US)

( * ) Notice: Subject to any disclaimer, the term of this patent is extended or adjusted under 35 U.S.C. 154(b) by 183 days.

(21) Appl. No.: 13/091,377

(22) Filed: Apr. 21, 2011

(65) Prior Publication Data

US 2012/0269330 A1   Oct. 25, 2012

(51) Int. Cl.
*H04M 11/00*   (2006.01)
(52) U.S. Cl.
USPC .............................................. 379/52; 701/440
(58) Field of Classification Search
USPC ............................. 379/52; 701/400, 418, 440
See application file for complete search history.

(56) References Cited

U.S. PATENT DOCUMENTS

| 2003/0229444 | A1* | 12/2003 | Bullock et al. | 701/202 |
| 2008/0071534 | A1* | 3/2008 | Johnson | 704/246 |
| 2008/0118056 | A1* | 5/2008 | Hjelmeland et al. | 379/420.01 |
| 2010/0082245 | A1* | 4/2010 | Patenaude et al. | 701/209 |
| 2010/0250243 | A1* | 9/2010 | Schalk et al. | 704/201 |
| 2012/0191341 | A1* | 7/2012 | Nara et al. | 701/420 |
| 2012/0229376 | A1* | 9/2012 | Matsumoto et al. | 345/156 |
| 2012/0290569 | A1* | 11/2012 | Yuhara et al. | 707/724 |

\* cited by examiner

*Primary Examiner* — Creighton Smith
(74) *Attorney, Agent, or Firm* — Leydig, Voit & Mayer, Ltd.

(57) ABSTRACT

The described method and system provide for utilizing a navigation system to facilitate communications between a call center and a disabled individual who may have difficulty hearing or speaking. In one implementation, if TTY services are unavailable through a TIM or TTY device, a call center may communicate with occupants of a vehicle through a vehicle navigation unit, utilizing a display and input method associated with the navigation unit. In another implementation, the call center may communicate with occupants of a vehicle through the navigation unit in the first instance.

19 Claims, 4 Drawing Sheets

NAVIGATION SYSTEM SUPPORT OF IN-VEHICLE TTY SYSTEM

BACKGROUND OF THE INVENTION

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

Many telematics services are dependent on voice communications between a user of the telematics unit and an operator at a TSP call center. In order to accommodate disabled individuals who may not be able to hear or speak, or may have difficulty hearing or speaking, a TSP may offer telematics services through a TTY (TeleTYpewriter) device, also known as a TDD (Telecommunications Device for the Deaf). The TTY device may connect to the telematics unit through a TIM (TTY Interface Module), allowing a person who is deaf and/or mute to utilize telematics services.

However, TIM devices may not be installed on all vehicles, may be installed improperly, or may malfunction. In other situations, such as upon impact during an accident or airbag deployment, the TTY device may become disconnected, damaged, or inoperable. Thus, it is an object in part to provide a system and method for disabled individuals to communicate with a TSP call center in the event of an emergency alternative to a TTY device. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and method for utilizing a navigation system to facilitate communications between a call center and a disabled individual who may have difficulty hearing or speaking. In one implementation of the invention, a component of the vehicle hardware, such as the telematics unit, which includes a network access device and a navigation unit, determines whether a TTY device within the vehicle is available to be used in communications between an occupant of the vehicle and a call center. The TTY device may be determined to be unavailable if a TIM of the vehicle is not installed or not operational, or if the TTY device is not connected or not operational. If the TTY device is unavailable, communications between a call center and the occupant of the vehicle may be conducted through the navigation unit of the vehicle.

The telematics unit or call center may first determine whether a user associated with the vehicle (e.g. the owner or telematics subscriber) needs TTY services (i.e. voice-to-text translation services). The telematics unit may further notify the call center if the TTY device is unavailable for communication. The telematics unit or the TIM may further determine whether the TTY device is operating in data mode or in voice mode, and the communications may be further processed according to that determination.

The communication from the call center to the vehicle through the telematics unit may be unrelated to navigation information, and may be a voice communication spoken by an operator, a typed-out communication typed into a keyboard at the call center, or a prewritten prompt selected by an operator or selected automatically by a computer at the call center. If the communication is a voice communication, it may be converted into text before being displayed to the occupant of the vehicle at the navigation unit. The occupant of the vehicle may further respond to the text displayed on the screen through a button, keyboard, or microphone in communication with the navigation unit.

In a further implementation, the navigation unit may be used in the first instance for communications between the call center and the occupant, without first determining whether a TTY device is available. In other further implementations, the processes described above may be implemented as instructions stored on a computer-readable medium that is part of the navigation unit or other vehicle hardware. It will be appreciated that the various instructions may be stored together on one hardware module or may be spread out across various hardware modules in accordance with the described inventive principles.

Other objects and advantages of the invention will become apparent upon reading the following detailed description and upon reference to the drawings.

DETAILED DESCRIPTION OF THE INVENTION

Figure 1:
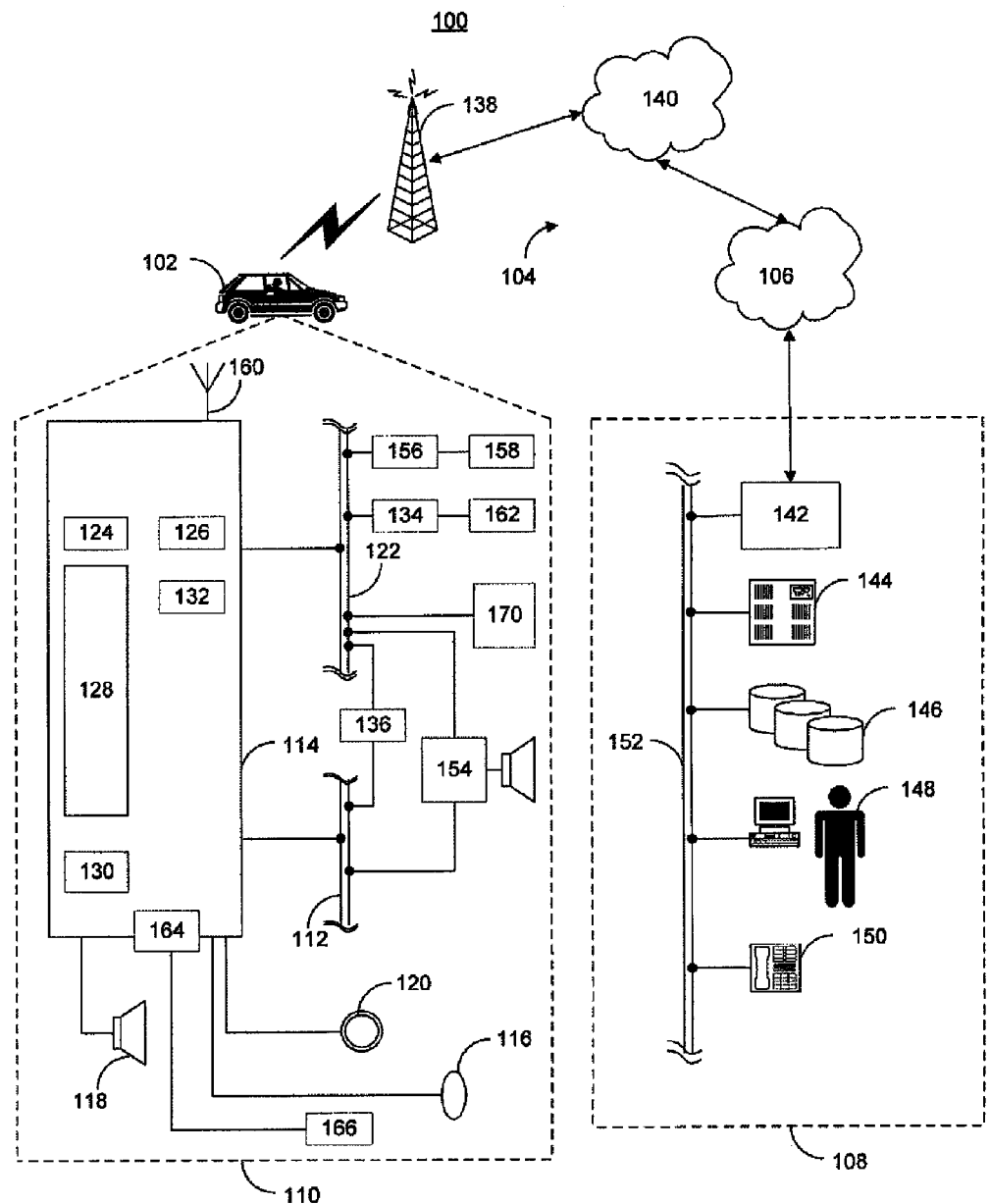
FIG. 1 is a schematic diagram of an operating environment for a mobile vehicle communication system usable in implementations of the described principles.

Before discussing the details of the invention and the environment wherein the invention may be used, a brief overview is given to guide the reader. In general terms, not intended to limit the claims, the invention is directed to a system and method for utilizing a navigation system to facilitate communications between a call center and a disabled individual who may have difficulty hearing or speaking. Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114. The navigation unit 132 may utilize a vehicle display 170 to display messages or graphics to the user, and may receive inputs through the vehicle display 170 (in implementations where the display is a touch screen) or through vehicle buttons 120. In other implementations, the navigation unit 132 may have its own display and input buttons associated with it (not depicted).

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

The telematics unit 114 may further provide TTY services by utilizing a TTY device 166 connected to the telematics unit 114 through a TIM 164. It will be appreciated that the TTY device 166 may be any type of TTY device known in the art, such as TTY devices produced by Ultratec, including but not limited to TTY devices with functionality such as transcribing incoming voice communications to text, allowing user input on a full keyboard, and transmitting communications in either data mode or voice mode. The TIM may determine whether the TTY device is operating in data mode or voice mode and communicate with the telematics unit such that the TTY device is able to communicate over wireless carrier system 104 through the telematics unit 114. It will further be appreciated that the TIM may be a component inside the telematics unit 114 or may be connected to the telematics unit 114 through an appropriate interface.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112. A display component 170 may further be connected to the vehicle bus and integrated into the vehicle dashboard, or located elsewhere within the vehicle, for displaying information related to various telematics services and for providing a graphical user interface. In a further implementation, the display may be a touch-screen display allowing input through the display as an alternative to buttons or controls 120. In alternative implementations, the display 170 may be connected directly to the telematics unit or may be included as part of the telematics unit.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few. Additionally, the vehicle sensors 162, the navigation unit 132, or the TIM 164 may include a sensor for detecting whether or not the TTY device 166 is attached and determining whether the TTY device 166 has become dislodged, for example, in the event of an accident or airbag deployment.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server.

As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
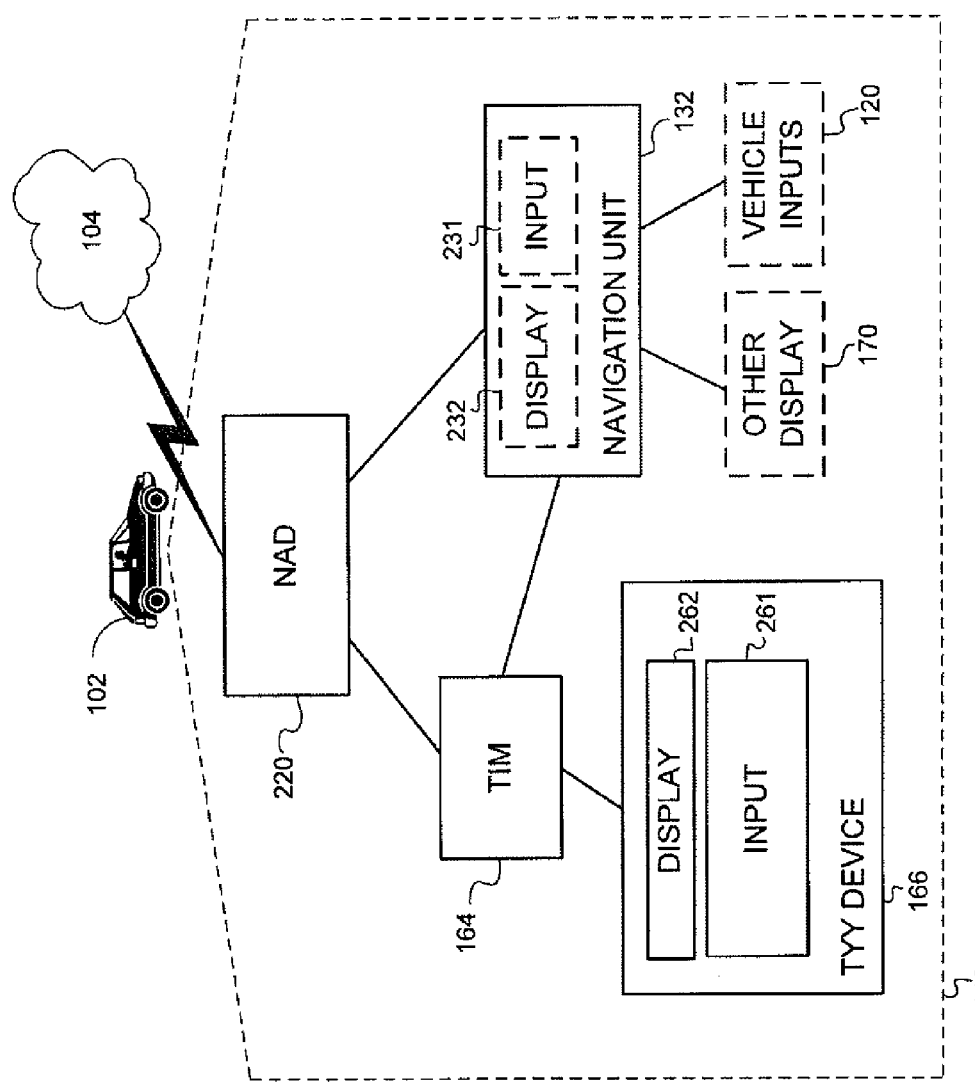
FIG. 2 is a schematic diagram showing relevant communication links between components within the vehicle in accordance with an implementation of the described principles.

FIG. 2 is a vehicle schematic showing the components of the vehicle of interest with the respect to the disclosed principles and the manner in which the components may be interrelated to execute those principles. It will be appreciated, however, that the illustrated architecture is merely an example, and that the disclosed principles do not require that the vehicle be configured precisely as shown.

In the illustrated example, the vehicle 102 includes vehicle hardware 110 comprising a NAD 220, TIM 164, and navigation unit 132 in communication with each other. It will be appreciated that the NAD 200, TIM 164, and navigation unit 132 may be part of the telematics unit or external to and connected to the telematics unit. It will further be appreciated that the telematics unit, the NAD 220, the TIM 164, and the navigation unit 132 may all include tangible non-transient computer-readable media as storage for instructions and applications, as well as processors for executing those instructions and applications. It will be appreciated that the instructions and applications corresponding to their functions as described below may be implemented on any one of, or on multiple components of, the vehicle hardware 110.

The TIM 164 may further be connected to a TTY device 166, comprising a display 262 (e.g. a screen for displaying incoming communications to a user) and input 261 (e.g. a keyboard for typing in a message). It will further be appreciated that the input 261 may include a microphone such that the a user of the TTY device 166 may transmit messages in voice format (through the microphone) or in a data or text format (through the keyboard). The TIM 164 may then determine whether the TTY device 166 is in data mode or voice mode, and the outgoing message may be processed by the TIM 164, the NAD 220, or a call center receiving the message over wireless network 104 accordingly.

In one implementation, the navigation unit 132 may include a display 232 and input 231 associated with the navigation unit 132, such as a screen for showing maps and/or directions and input buttons on the vehicle dashboard or on the navigation unit screen (e.g. if the display is a touch screen). In an alternative implementation, the navigation unit 132 may not have its own inputs 231 and may instead rely on vehicle inputs, such as buttons or controls 120, or may rely on receiving voice commands from the microphone 116. The navigation unit 132 may also not have its own display 232 and may rely on a vehicle display 170, which may or may not be a touch screen capable of receiving input.

Figure 3:
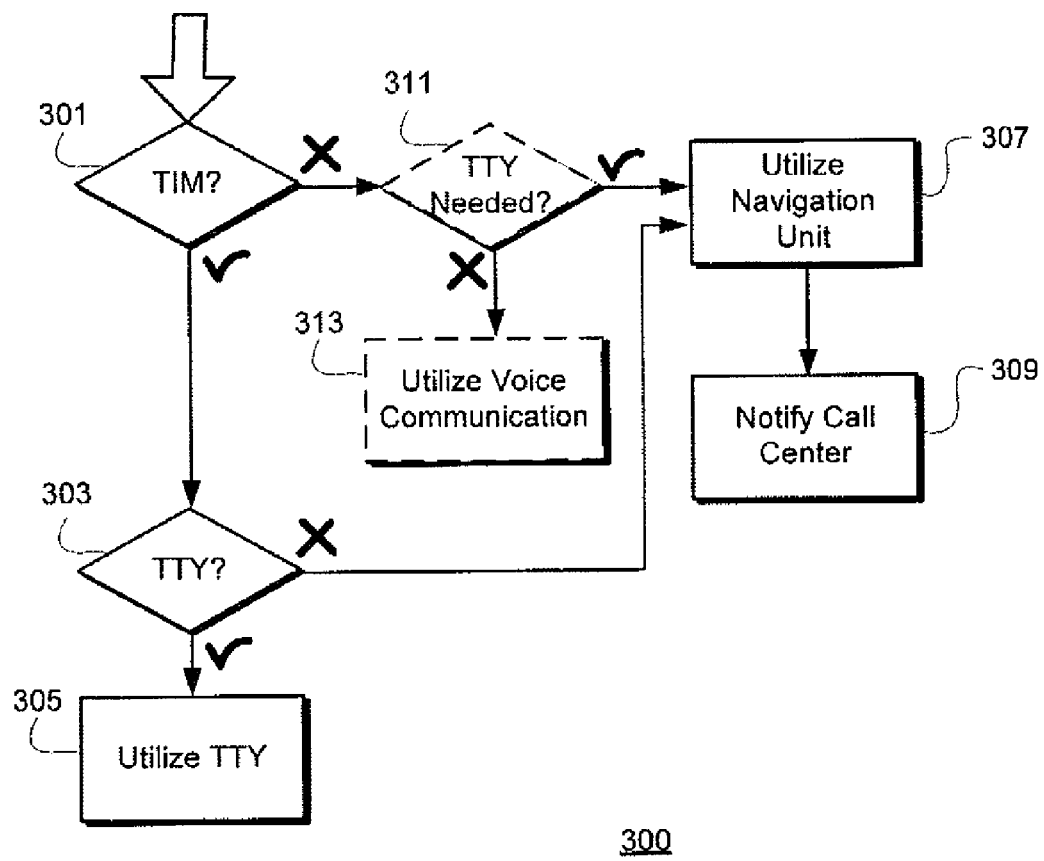
FIG. 3 is a flowchart illustrating a process for utilizing a vehicle navigation system to communicate with a user when a TTY device is unavailable in accordance with an implementation of the described principles.

With further reference to the architecture of FIGS. 1 and 2, and turning more specifically to FIG. 3, a process 300 is depicted for determining whether to use a TTY device or a navigation unit for communicating with a user of the vehicle. It will be appreciated that the programming for the steps described below may be implemented on the navigation unit, the TIM, the NAD, or elsewhere on the telematics unit.

In one exemplary situation, if a TIM is determined to be installed and operational 301, and a TTY is determined to be connected to the TIM and operational 303, communications sent from the call center to the vehicle will be processed using the TTY device 305, such that the call center's communications may be displayed on the TTY device's screen and/or the user may use the TTY device's input to respond. Determining whether the TIM is installed and operational and determining whether the TTY device is connected and operational may be performed by a sensor corresponding to the TIM or TTY device located at the navigation unit or elsewhere in the vehicle, or it may be performed by instructions programmed into the navigation unit or elsewhere in the vehicle for checking whether the TIM and TTY are responsive and operating properly (e.g. through sending test commands or acknowledgement requests).

In another exemplary situation, if the TIM is installed and operational 301, but the TTY device is not connected 303 (e.g. the corresponding sensor may determine that the TTY device has become dislodged), the navigation unit may be used 307 to communicate with the use of the vehicle, and the call center may be notified 309 that the TTY is not operational. Notifying the call center may allow the call center to communicate with the vehicle in a different manner. For example, the call center may follow a different protocol for responding through the navigation unit than through the TIM and TTY device. The call center may also determine whether the vehicle owner has subscribed to the call center's TTY services and whether it needs to repair the TTY device or inform the user that the TTY device is not connected.

In yet another exemplary situation, the TIM may not be installed in the first place or the TIM may be inoperable 301, and the navigation unit may be used 307 to communicate with the user. Furthermore, the call center may be notified 309 as described above with respect to the nature of the TIM and the call center may respond accordingly.

In a further implementation, if the TIM is not installed 301, the call center or the telematics unit may check whether the user is signed up for TTY services at all 311. For example, if a TIM is not installed 301, it may be due to the fact that the user does not require TTY services, and this information may be stored at the call center or the telematics unit. If the user is not a user that requires TTY services 311, the call center may simply utilize voice communications 313 to communicate with the user. If the user does require TTY services 311, the call center may communicate with the user through the navigation unit 307 and notify the call center 309 as described above.

It will be appreciated that the foregoing steps described above may be performed in a different order while adhering to the inventive principles described therein. For example, the call center of telematics unit may, as a preliminary check, determine whether TTY services are needed 311. If the TTY services are not needed, ordinary voice communications 313 are used and none of the other steps need to be performed.

It will further be appreciated that, while the implementations above have described the navigation unit as a back-up to the TIM and the TTY device, the navigation unit may also be used to communicate with deaf and/or mute users in the first instance. For example, instead of providing a TIM and TTY device to users who request TTY services, the call center may simply install or enable TTY communications through the navigation unit. In a further implementation, an input device such as a keyboard may be connected to the navigation unit to facilitate user input into the navigation unit. In yet another further implementation, with appropriate programming and hardware, the navigation unit may be used as the TIM and a TTY device could be connected to the navigation unit.

Figure 4:
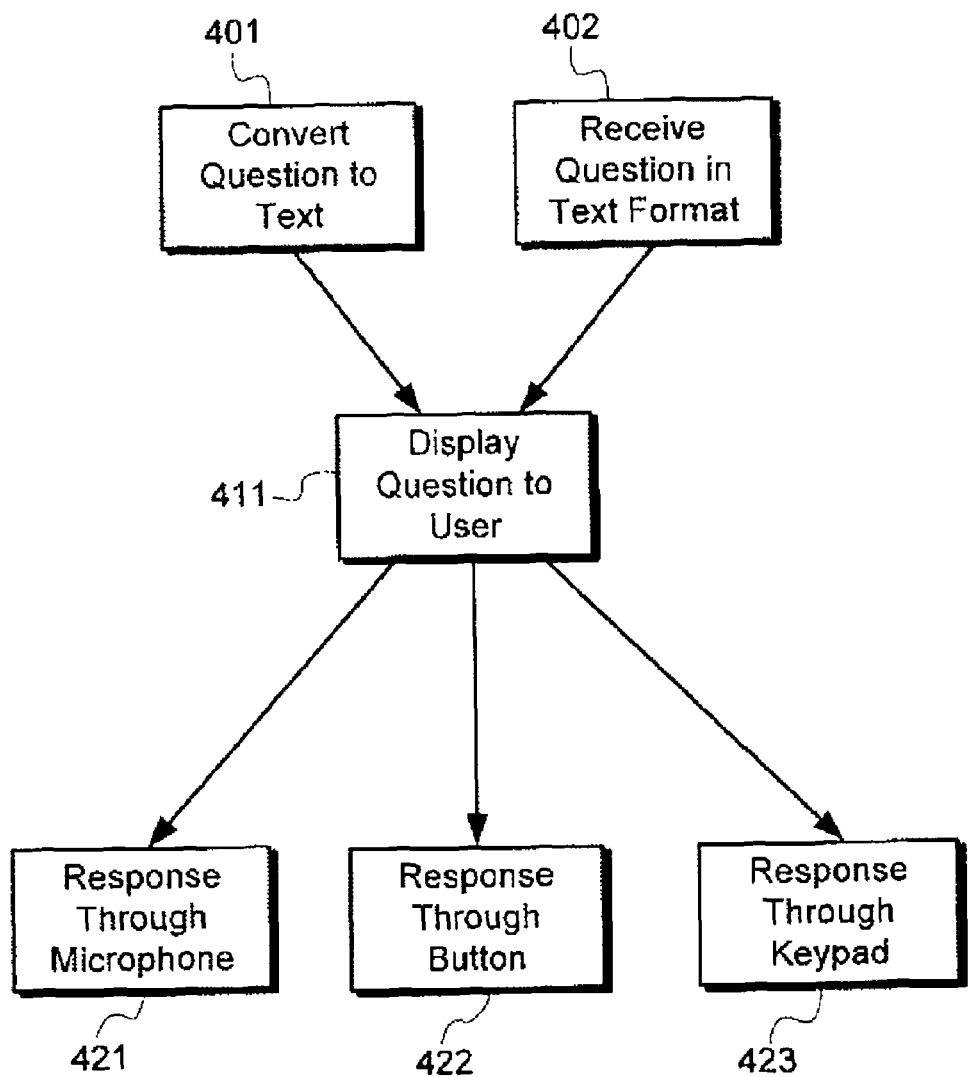
FIG. 4 is a flowchart illustrating a process for handling communications between a call center and a vehicle in accordance with an implementation of the described principles.

With further reference to the architecture of FIGS. 1 and 2, and turning more specifically to FIG. 4, a process 400 for is depicted illustrating how communications between the call center and the vehicle may be handled through the TTY device or through the navigation unit. In one implementation, an operator at the call center may communicate with the vehicle through a vocal question, such as, for example, asking the occupant(s) of the vehicle about his/her/their welfare. The vocal question may be converted to text 401 at the call center and transmitted to the vehicle telematics unit in a data format for display to the user 411, or the vocal question may be sent to the vehicle telematics unit in an audio format and converted to text 401 at the telematics unit, the TTY device, the navigation unit, or other vehicle modules such that it may be displayed to the user 411.

In another implementation, the operator at the call center may type a question into a computer at the call center, may select a prewritten question or prompt (e.g. asking if anybody is hurt), or the call center may be programmed to respond automatically to a detected accident or airbag deployment with a prewritten question or prompt, and the vehicle receives this question in a text or data format 402. In a further implementation, the predetermined question or questions may be in yes/no format to enable faster answers, particularly where the communications are being conducted through the navigation unit and a full keyboard may not be available to the user.

After the question is displayed to the user 411, the user may respond through a microphone 421 by vocalizing the answer, respond through a button 422 (e.g. when a navigation unit without a full keyboard is being used), or respond through a keypad or keyboard 423 (e.g. as through a TTY device). Displaying the question to the user 411 and giving the user a variety of response options allows the call center to quickly determine whether or not to contact a PSAP (Public Safety Answering Point) and what type of emergency may be occurring. For example, if an occupant of a vehicle responds that someone is injured, the call center may immediately contact a medical PSAP to dispatch an ambulance. In another example, if the call center receives no response at all after attempting to contact vehicle occupants, it may infer that the occupants are unable to respond and may also contact a medical P SAP.

It will be appreciated that, in other implementations, the question may be transmitted to the user both through the vehicle speakers and displayed to the user, in order to facilitate optimal response time. For example, some of the occupants or drivers of the vehicle may be disabled while others may not be, allowing the occupants or drivers to respond in whichever manner is faster for them.

It will be appreciated that the described system allows for utilizing a navigation system to facilitate communications between a call center and a disabled individual who may have difficulty hearing or speaking. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for utilizing a vehicle navigation unit to support a vehicle TTY (teletypewriter) system, the method comprising:
   determining whether a TTY device within the vehicle is available to be used in communications between an occupant of the vehicle and a call center; and
   in response to determining that the TTY device is unavailable, utilizing a navigation unit within the vehicle to display communications from the call center to the occupant of the vehicle.

2. The method of claim 1, wherein determining whether the TTY device is available further comprises determining whether at least one of the following conditions is met:
   a TIM (TTY interface module) is not installed;
   the TIM is not operational;
   the TTY device is not connected; and
   the TTY device is not operational.

3. The method of claim 2, the method further comprising: before utilizing the navigation unit to display communications, determining that a user associated with the vehicle needs TTY services.

4. The method of claim 1, the method further comprising: notifying the call center that the TTY device is unavailable.

5. The method of claim 1, the method further comprising:
   determining whether the TTY device is in data mode or in voice mode; and
   processing communications to be sent to the call center based on whether the TTY device is in data mode or in voice mode.

6. The method of claim 1, wherein the communications from the call center are not related to navigation information.

7. The method of claim 1, wherein the communications from the call center are one of a voice communication, a typed communication, and a prewritten prompt.

8. The method of claim 1, further comprising:
   receiving voice communications from the call center; and
   converting the voice communications from the call center into text.

9. The method of claim 1, further comprising:
   receiving an input, at the navigation unit, from the occupant in response to the text displayed to the occupant.

10. The method of claim 9, wherein the input is received via at least one of a button, keyboard, and microphone connected to the navigation unit.

11. A non-transitory computer-readable medium, part of a telematics unit of a telematics-equipped vehicle, having processor-executable instructions stored thereon for utilizing a vehicle navigation unit to support a vehicle TTY (teletypewriter) system, the processor-executable instructions, when executed by a processor, causing the following steps to be performed:
   determining whether a TTY device within the vehicle is available to be used in communications between an occupant of the vehicle and a call center; and
   utilizing a navigation unit within the vehicle to display communications from the call center to the occupant of the vehicle in response to determining that the TTY device is unavailable.

12. The non-transitory computer-readable medium of claim 11, wherein determining whether the TTY device is available further comprises determining whether at least one of the following conditions is met:
   a TIM (TTY interface module) is not installed;
   the TIM is not operational;
   the TTY device is not connected; and
   the TTY device is not operational.

13. The non-transitory computer-readable medium of claim 11, the processor-executable instructions, when executed, further causing the following steps to be performed:
   before utilizing the navigation unit to display communications, determining that a user associated with the vehicle needs TTY services.

14. The non-transitory computer-readable medium of claim 11, the processor-executable instructions, when executed, further causing the following steps to be performed:
   notifying the call center that the TTY device is unavailable.

15. The non-transitory computer-readable medium of claim 11, the processor-executable instructions, when executed, furl her causing the following steps to be performed:
   determining whether the TTY device is in data mode or in voice mode; and
   processing communications to be sent to the call center based on whether the TTY device is in data mode or in voice mode.

16. The non-transitory computer-readable medium of claim 11, wherein the communications from the call center are not related to navigation information.

17. The non-transitory computer-readable medium of claim 11, wherein the communications from the call center are one of a voice communication, a typed communication, and a prewritten prompt.

18. The non-transitory computer-readable medium of claim 11, the processor-executable instructions, when executed, further causing the following steps to be performed:
   receiving voice communications from the call center; and
   converting the voice communications from the call center into text.

19. The non-transitory computer-readable medium of claim 11, the processor-executable instructions, when executed, further causing the following steps to be performed:
   receiving an input via at least one of a button, keyboard, and microphone from the occupant in response to the text displayed to the occupant.

* * * * *